United States Patent [19]

Paajanen et al.

[11] Patent Number: 5,189,632
[45] Date of Patent: Feb. 23, 1993

[54] PORTABLE PERSONAL COMPUTER AND MOBILE TELEPHONE DEVICE

[75] Inventors: Reijo Paajanen; Mikko Terho; Tom Höglund, all of Tampere, Finland

[73] Assignee: Oy Nokia Ab, Helsinki, Finland

[21] Appl. No.: 734,731

[22] Filed: Jul. 23, 1991

[30] Foreign Application Priority Data

Aug. 20, 1990 [FI] Finland .................. 904111

[51] Int. Cl.$^5$ .................. G06F 1/00; H04M 11/00
[52] U.S. Cl. .................. 364/705.05; 379/110
[58] Field of Search .................. 364/705.05; 379/110

[56] References Cited

U.S. PATENT DOCUMENTS

| | | | |
|---|---|---|---|
| 4,024,347 | 5/1977 | Carter | 379/110 |
| 4,533,791 | 8/1985 | Read et al. | 379/110 |
| 4,748,574 | 5/1988 | Tuchto | 364/705.05 |
| 5,008,927 | 4/1991 | Weiss et al. | 379/110 |

FOREIGN PATENT DOCUMENTS 1-314462 12/1989 Japan .

OTHER PUBLICATIONS

Sederholm et al, "Intelligent Telephone" *IBM Tech. Disclosure Bulletin* vol. 23 No. 9 Feb. 1981 pp. 4006-4008.

Corcoran, "Banking Futures" *Scientific American* Feb. 1990, pp. 65-66.

*Primary Examiner*—David M. Malzahn
*Attorney, Agent, or Firm*—Finnegan, Henderson, Farabow, Garrett & Dunner

[57] ABSTRACT

A portable computer telephone device comprising a portable personal computer and a mobile phone integrated into one and the same body structure said body having a display screen (3) and a keyboard member (2) for operating the computer and the mobile telephone. To improve the convenience of use of such an integrated device, the keyboard member (2) is arranged to be movable between open and closed positions with respect to the rest of the body structure (1) in such a way that in the open position the whole display screen (3) and at least the whole keyboard (4, 5) of the computer are accessible for operating the computer and in the closed position the keyboard member (2) covers a part of the display screen and leaves the buttons (6) of the mobile telephone part 3(a) of the display screen accessible for operating the mobile telephone.

3 Claims, 2 Drawing Sheets

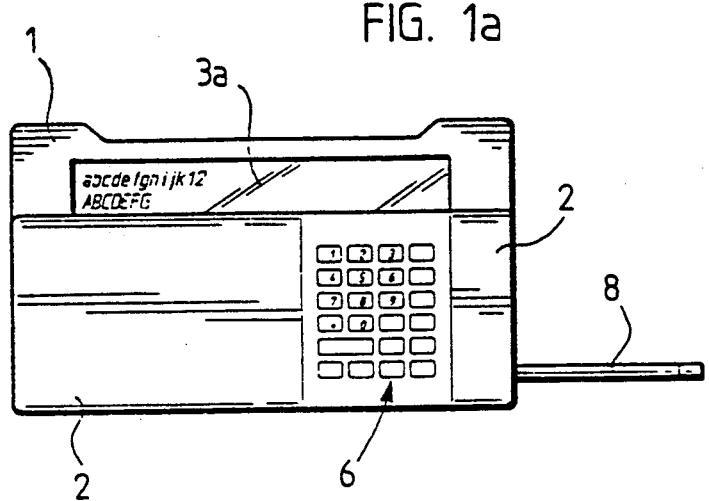
FIG. 1a
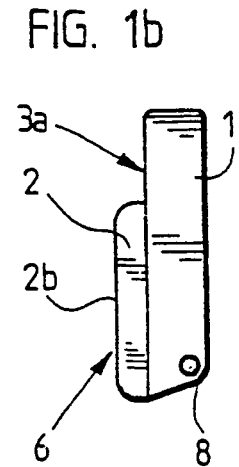
FIG. 1b
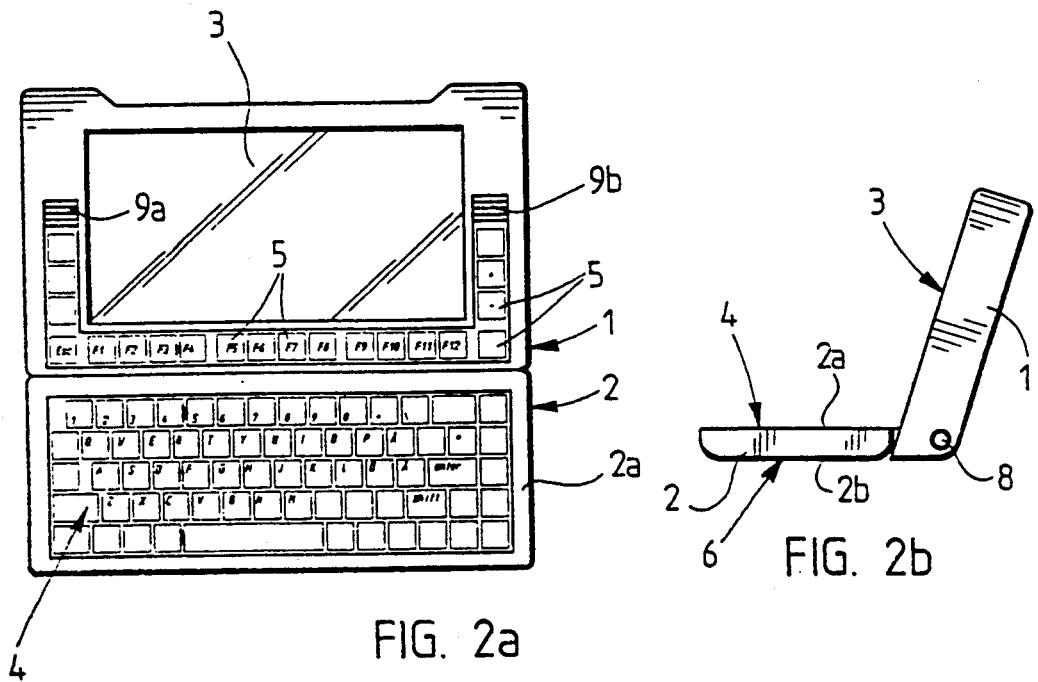
FIG. 2a
FIG. 2b

PORTABLE PERSONAL COMPUTER AND MOBILE TELEPHONE DEVICE

BACKGROUND OF THE INVENTION

The invention relates to a portable personal workstation comprising a portable personal computer and a mobile telephone integrated into one and the same body structure provided with a display screen and a keyboard member for operating the computer and the mobile phone.

Due to an increasing need of personal data processing and data transmission, portable personal computers and mobile phones have become rapidly general. By means of a combination of a portable microprocessor provided with a modem and a mobile telephone, it is at present possible to attend to data communications practically anywhere. However, a problem has been that for instance the size of a combination device like this and the wires or fittings possibly needed make the operating characteristics of the device unsuitable for portable use.

SUMMARY OF THE INVENTION

The object of the present invention is thus to provide such a device with an improved convenience of use. This is achieved by means of a workstation of the type described in the beginning in such a way that the keyboard member is arranged to be movable between open and closed positions with respect to the rest of the body structure, so that in the open position the whole display screen and at least the whole keyboard of the computer are accessible for operating the computer and in the closed position the keyboard member covers a part of the display screen and leaves at least some of the buttons of the mobile telephone and a part of the display unit accessible for operating the mobile telephone.

The basic idea of the invention is to use the same display screen for the mobile telephone and for the computer and to arrange the keyboard member to be movable with respect to the rest of the body structure in such a way that when shifting the keyboard member from computer use to mobile phone use the keyboard member moves partly over the display screen and leaves only the part of it visible which is needed for mobile telephone use and reduces the outer dimensions of the body structure at the same time.

By means of the solution of the invention, the combination device described above can be provided with the smallest possible body structure and with a convenience of use better than before.

In an especially preferable embodiment of the invention, in which the body structure comprises a body member with a display screen and a keyboard member pivoted on the body, which members can be turned against each other to a closed position and opened to an open position, the keyboard member is arranged to be double-sided in such a way that at least a part of the keys of the computer and at least a part of the buttons of the mobile telephone are situated on opposite sides of the keyboard member. In this way it is possible to minimize the outer dimensions of the keyboard member and thus also of the whole body structure and to hide the keyboard of the computer handily at the same time, the workstation being ready for mobile telephone use.

BRIEF DESCRIPTION OF THE DRAWINGS

The invention is explained in the following more detail in drawings in which

FIG. 1a shows a front view of a workstation ready for mobile phone use,

FIG. 1b shows a side view of the workstation in the position shown in FIG. 1a,

FIG. 2a shows a front view of the workstation when used as a computer,

FIG. 2b shows a side view of the workstation in the position shown in FIG. 2a and FIG. 3 shows further a perspective view of the workstation in the user's hand ready for mobile phone use.

Figure 3:
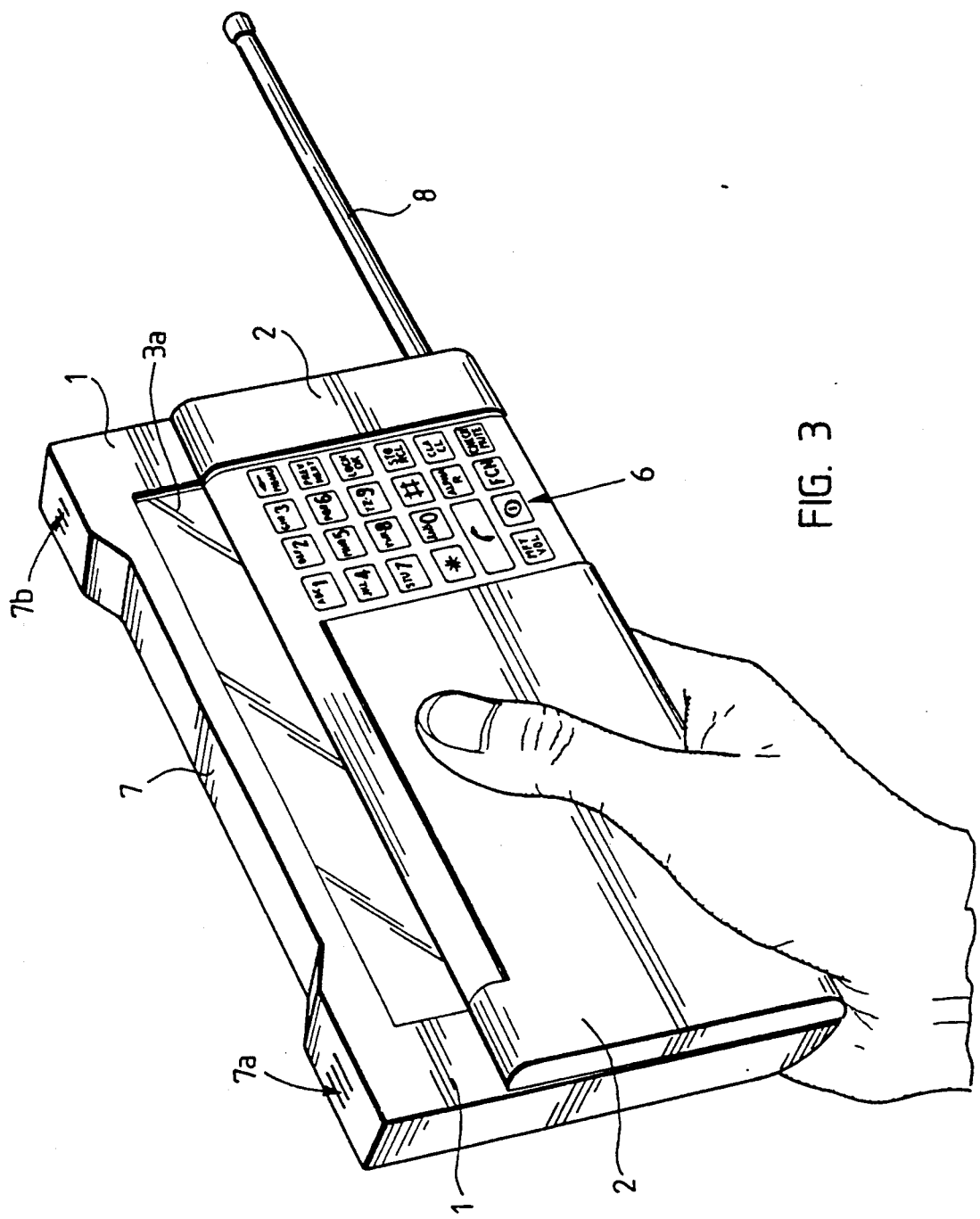

The body structure of a portable personal workstation shown in FIGS. 1 and 2 comprises a body member 1 and a keyboard member 2 pivoted thereon and being substantially of the same length as the body member, but narrower. By turning the keyboard member 2 with respect to the body member 1, the body structure can be opened to an open position according to FIGS. 2a and 2b, in which the keyboard member and the body member form a specific angle with each other and the workstation is ready for computer use, and closed to a closed position according to FIGS. 1a and 1b, in which the keyboard member and the body member are placed against each other and the workstation is ready for mobile phone use.

On the inner surface of the body member 1 there is a display screen 3, the line and column numbers of which correspond to those of a normal PC display. An upper part 3a of the display screen is used as a display screen of the mobile phone, when the workstation is in the position for mobile phone use. Consequently, the keyboard member 2 and the body member 1 are then turned against each other according to the FIGS. 1a and 1b, and the keyboard member, being narrower than the body member, covers the lower part of the display screen and leaves the upper part 3a open for use.

On the inner surface 2a of the keyboard member 2 there is a standard computer keyboard 4, some of the function keys (Esc, Scrl lock, etc., F1 to F12) being arranged on the inner surface of the body member adjacent to the display screen 3 in such a way that also these keys will be covered under the keyboard member 2 in the closed position of the device (cf. FIG. 1a). These function keys are indicated by reference numeral 5. On the outer surface 2b of the keyboard member are arranged push buttons of the keypad 6 of the mobile phone, comprising at least some of the buttons needed for the use of the mobile phone, and preferably all actuating buttons of the mobile phone. In the mobile phone position of the device, the display screen 3 and the computer keyboard 4 are placed against each other, the computer keyboard and most of the display screen are under cover, and the keypad 6 of the mobile phone and the upper part 3a of the display screen are situated adjacent to each other on the same outer side of the body structure.

For an illustration of the size of the device, FIG. 3 shows a perspective view of the workstation of the invention in the user's hand ready for mobile phone use. As appears from the figure, an upper side 7 of the body member is shaped to form a handle part of the mobile phone with the mouthpiece part 7a and a spacer 7b are being arranged at the opposite ends of this upper side. Another pair of phone parts 9a, 9b are arranged on the inner surface of the body member 1 adjacent to the display screen 3. By means of these it is possible to carry out a so-called hands free call. An antenna of the mobile phone is indicated by reference numeral 8. A built-in antenna is also possible in some mobile phone systems.

Because the actual inventive idea relates only to the body structure of the device, the location of a PC part known per se and a radio part known per se inside the body structure has not been presented. The PC part is always the same anywhere, but the type of the radio part varies according to what kind of a mobile phone system (NMT, GSM, TACS) is used within a respective area. The inner structure of the device can naturally vary in many ways. For data transmission by radio, the device has a built-in modem. As examples of standard equipments of the workstation of the invention can be mentioned a 80386 or 80486 processor, a VGA graphics display, a hard disk based on fast EEPROM as well as software for data communication.

Though the invention has above been explained with reference to the example of the enclosed drawing, it is clear that the invention is not restricted thereto, but it can be varied in many ways within the scope of the inventive idea presented above and in the enclosed claims. For instance, it is not absolutely necessary to make the keyboard member and the rest of the body structure movable with respect to each other expressly by pivoting, but the keyboard member can e.g. be made to slide, so as to slide into the mobile phone position partly over the display screen. The double-sidedness of the keyboard is not absolutely necessary either, but the keys and buttons needed for both operating positions of the workstation can also be situated on the same side of the keyboard member, for instance in such a way that the part of the keyboard not needed at a particular time is covered by a separate protective cover. By means of a double-sided keyboard it is, however, possible to achieve an improved convenience of use due to the smaller outer dimensions. Also other functions can be integrated to the workstation, which can, e.g. in the mobile phone position of FIG. 3, also be used as a normal pocket calculator.

We claim:

1. A portable computer/telephone device comprising a body structure, a personal computer unit and a mobile telephone unit housed in said body structure, said body structure comprising a first part having a display screen on one side thereof or visually displaying the results of operations of said computer and telephone units, a second part pivotally connected to said first part for movement between an open position and closed position, said second part having a computer keyboard containing at least some of the keys for operating said computer unit on one side thereof that lies adjacent said display screen and is accessible to a user of said computer unit when said second part is in the open position and having a telephone keypad on an opposite side thereof containing at least some of the keys for operating said telephone unit, said one side of said second part lying against said one side of said first part and covering over a portion of the display screen when said second part is in the closed position.

2. The device of claim 1, wherein the display screen displays the results of operation of said keyboard of said computer unit in a first portion thereof and the results of operation of said keypad of said telephone unit in a second portion thereof, said second part covering over said first portion of the display screen so that only said second portion is visible to the user of the device and said keypad being adjacent to said second portion of the screen when said second part is in the closed position.

3. The device of claim 2, including additional keys for operating said computer unit on said first part adjacent the display screen; said second part in the closed position covering over said additional keys and said keyboard of the computer unit.

* * * * *

UNITED STATES PATENT AND TRADEMARK OFFICE
CERTIFICATE OF CORRECTION

PATENT NO. : 5,189,632
DATED : February 23, 1993
INVENTOR(S) : Reijo Paajanen et al.

It is certified that error appears in the above-identified patent and that said Letters Patent is hereby corrected as shown below:

Claim 1, column 4, line 9, "or" should read --for--.

Signed and Sealed this

Twenty-fifth Day of January, 1994

Attest:

BRUCE LEHMAN

*Attesting Officer*  *Commissioner of Patents and Trademarks*